(12) United States Patent
Kump

(10) Patent No.: US 6,704,440 B1
(45) Date of Patent: Mar. 9, 2004

(54) METHOD AND APPARATUS FOR PROCESSING A MEDICAL IMAGE CONTAINING CLINICAL AND NON-CLINICAL REGIONS

(75) Inventor: Kenneth Scott Kump, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/339,540

(22) Filed: Jun. 24, 1999

(51) Int. Cl.[7] .................................................. G06K 9/00
(52) U.S. Cl. ...................... 382/132; 382/226; 382/240; 128/922; 250/582
(58) Field of Search ................................ 382/128, 266, 382/100, 132, 131, 240, 260; 378/4, 221, 64, 39; 128/922; 250/582; 356/39; 377/10

(56) References Cited

U.S. PATENT DOCUMENTS

| | | | |
|---|---|---|---|
| 4,315,318 A | | 2/1982 | Kato et al. |
| 4,674,125 A | | 6/1987 | Carlson et al. |
| 4,716,414 A | | 12/1987 | Luttrell et al. |
| 4,718,104 A | | 1/1988 | Anderson |
| 4,943,707 A | | 7/1990 | Boggan |
| 4,969,204 A | | 11/1990 | Melnychuck et al. |
| 5,461,655 A | | 10/1995 | Vuylsteke et al. |
| 5,467,404 A | | 11/1995 | Vuylsteke et al. |
| 5,546,473 A | | 8/1996 | Buytaert et al. |
| 5,616,930 A | | 4/1997 | Janssens et al. |
| 5,644,662 A | | 7/1997 | Vuylsteke |
| 5,652,776 A | | 7/1997 | Riet |
| 5,717,791 A | | 2/1998 | Labaere et al. |
| 5,778,043 A | * | 7/1998 | Cosman ........................ 378/65 |
| 5,781,198 A | * | 7/1998 | Korn .......................... 345/435 |
| 5,832,055 A | | 11/1998 | Dewaele |
| 6,078,694 A | * | 6/2000 | Takahashi et al. ........... 382/238 |
| 6,115,480 A | * | 9/2000 | Washizawa .................. 380/103 |
| 6,126,599 A | * | 10/2000 | Jago et al. ................... 600/437 |
| 6,137,109 A | * | 10/2000 | Hayes .................... 250/363.05 |
| 6,148,060 A | * | 11/2000 | Collins et al. ................. 378/65 |
| 6,298,109 B1 | * | 10/2001 | Ergun et al. .................... 378/4 |
| 6,317,510 B1 | * | 11/2001 | Murakami ................... 382/132 |

OTHER PUBLICATIONS

"The Expanding Role of Medical Physics in Diagnostic Imaging", Frey et al., Proceedings of the 1997 AAPM Summer School.

"Histogram–Directed Processing of Digital Chest Images", McAdams et al., Investigative Radiology, Mar. 1986, vol. 21.

"A Fully Automated Algorithm for the Segmentation of Lung Fields on Digital Chest Radiographic Images", Duryea et al., Medical Physics, vol. 22, No. 2, Feb. 1995.

* cited by examiner

Primary Examiner—Jayanti K. Patel
Assistant Examiner—Barry Choobin
(74) Attorney, Agent, or Firm—McAndrews, Held & Malloy, Ltd.; Peter J. Vogel; Michael J. Dellapenna

(57) ABSTRACT

A method and system for pre-processing a radiation image containing a clinical region of interest and a non-clinical region. The method includes forming a border proximate the clinical region and performing image filtering to filter the clinical region and the border. The non-clinical region may be collimated, and at least a portion of the collimated region may be replaced with values based on pixel values within the region of interest. The system includes obtaining a radiation image having clinical and non-clinical regions, apparatus identifying the non-clinical region, a multi-resolution pre-processing subsystem removing the non clinical region to form an intermediate image and then adding a border to the intermediate image, and a multi-resolution imaging subsystem performing multi-resolution processing of the clinical region and border. Assigned border pixels values may be based on, equal to, or mirror associated or adjacent clinical region pixel values.

33 Claims, 5 Drawing Sheets

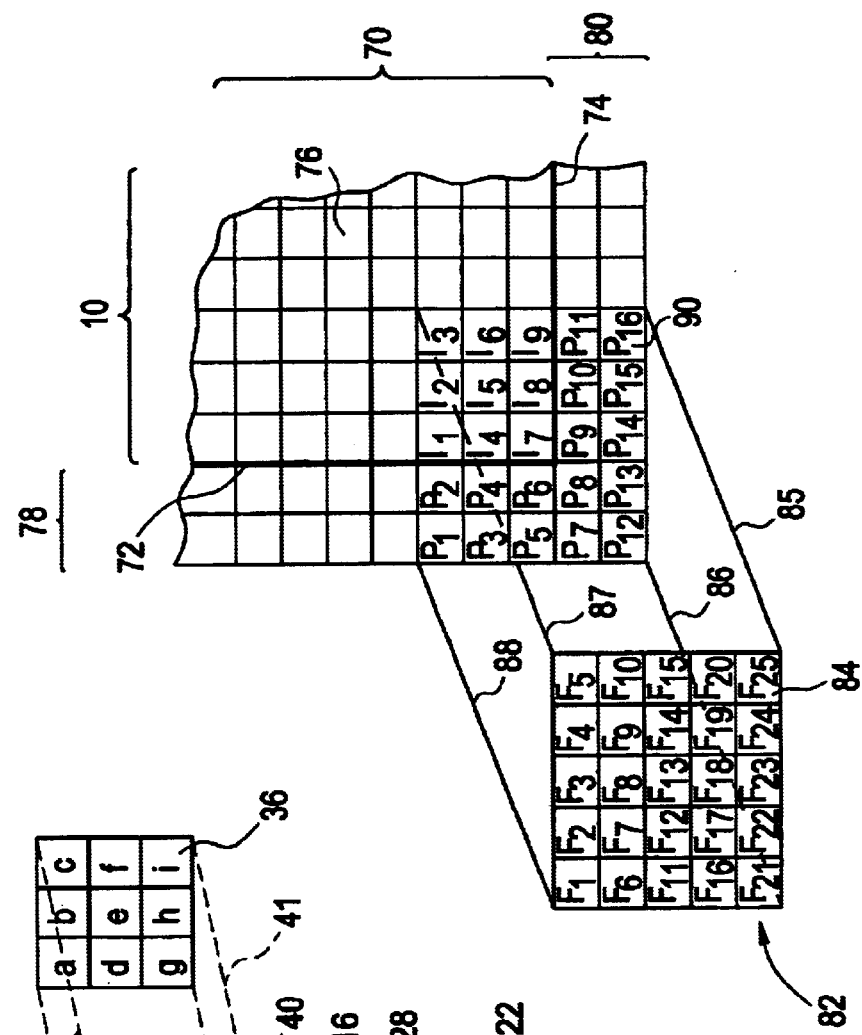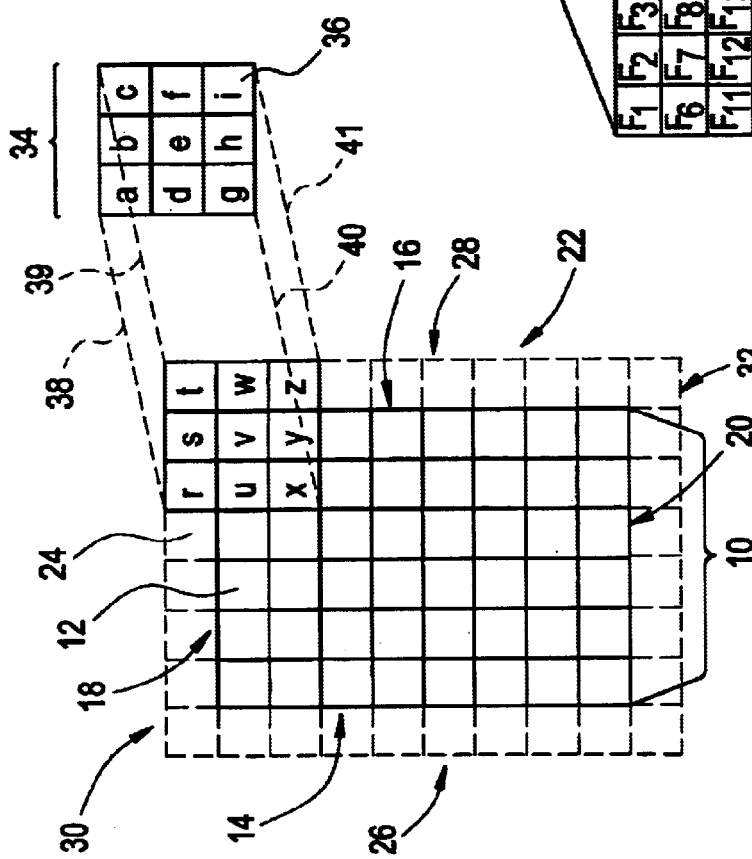

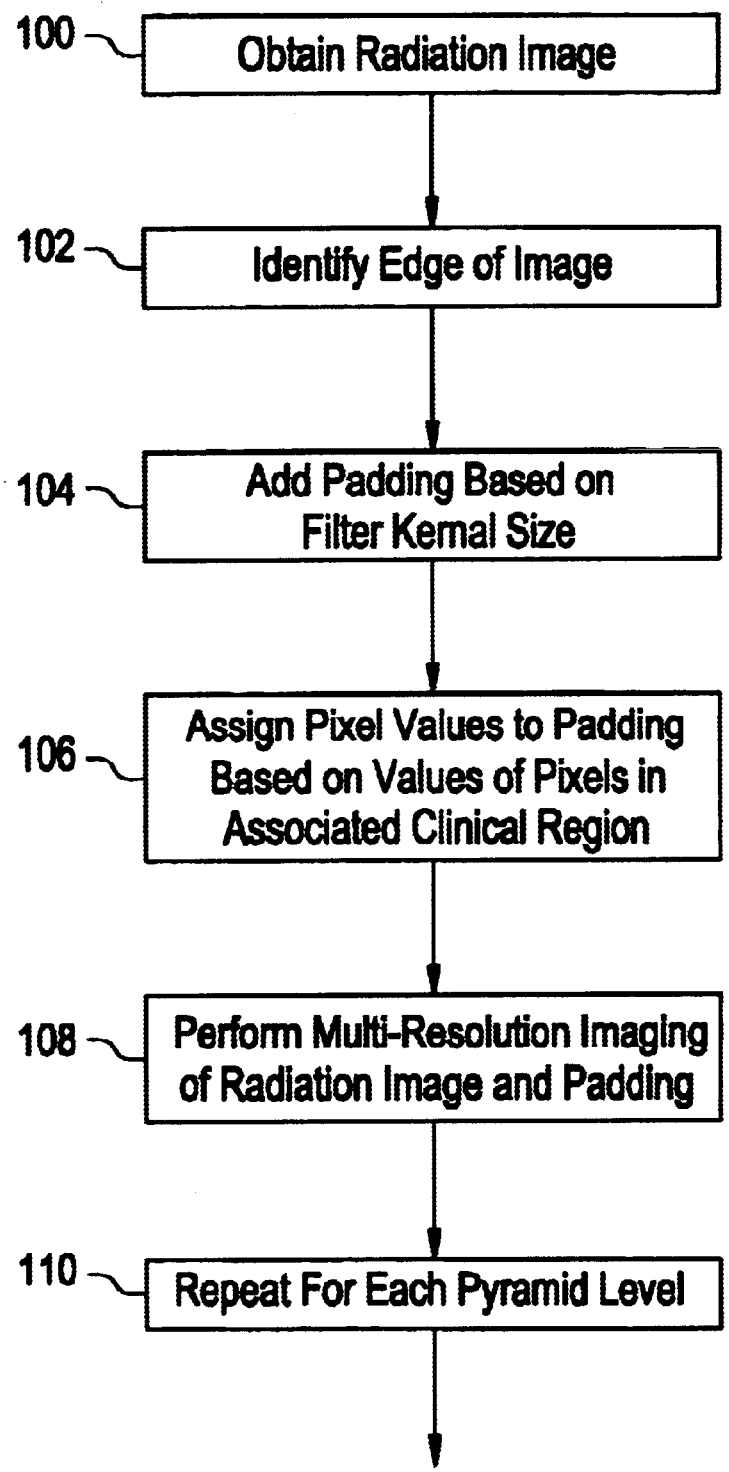

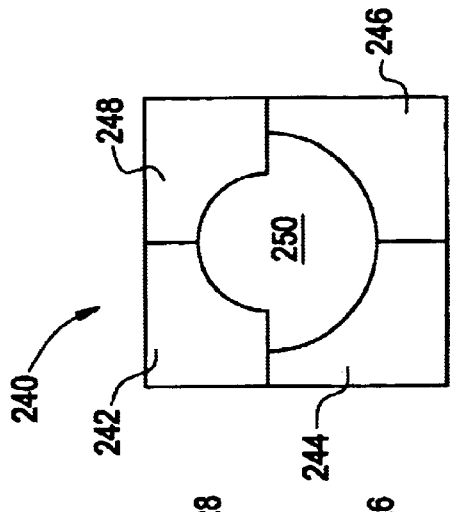
FIG. 5
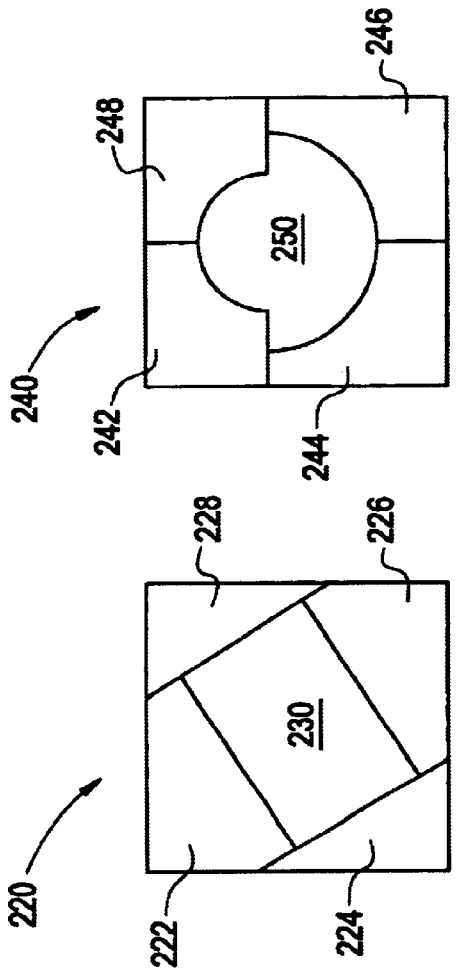
FIG. 6
FIG. 7
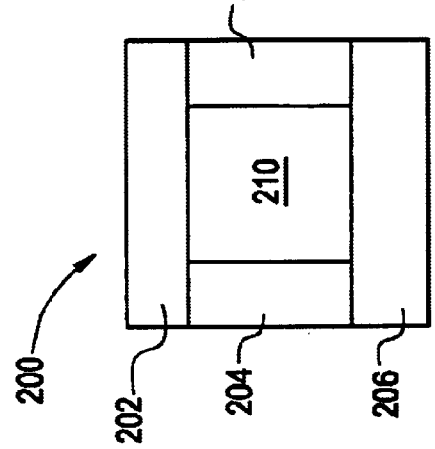
FIG. 8
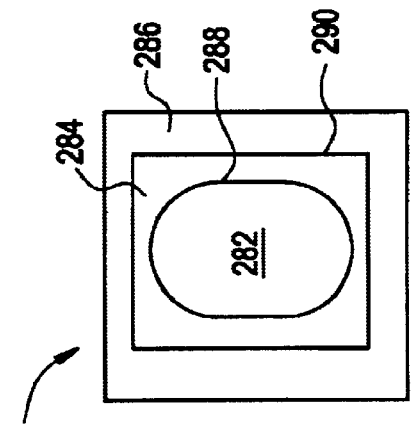
FIG. 9
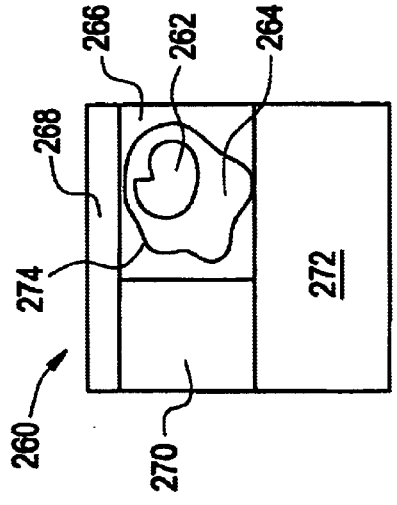
FIG. 10

(2) vertical padding

```
5 4 4 5 6 7 8 9 2
6 5 5 6 2 1 0 3 4
6 5 5 6 2 1 0 3 4
5 4 4 5 6 7 8 9 2
3 1 1 3 4 9 7 3 2
```

(1) horizontal padding

METHOD AND APPARATUS FOR PROCESSING A MEDICAL IMAGE CONTAINING CLINICAL AND NON-CLINICAL REGIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention generally relates to image processing carried out in connection with medical imaging, such as digital radiography. More particularly, the present invention relates to a method and apparatus for identifying non-clinical regions in a medical image and correcting therefor. In addition, the present invention relates to a method and apparatus for enhancing imaging processing of edges of medical diagnostic images.

In the past, radiation imaging systems have been proposed which capture images representative of an X-ray scan of a region of interest obtained from a patient. The scan of the region of interest is captured upon a film, screen, digital detector or the like and later converted by a radiation image processing system to a radiation image comprised of gray scale pixels representative of the region of interest of the patient displayable to a physician. Before display, the radiation image is image processed, such as through noise filtering, contrast enhancement, data compression, and the like.

According to one image processing technique, a digital signal representation of a radiation image is first decomposed into a multi-resolution (MR) representation containing localized image detail at multiple scales or frequencies. During MR processing, the image is decomposed into a series of processed images at multiple resolution levels. Multi-resolution imaging decomposes an original or basic image into different resolution or frequency images/bands. The decomposed image also contains a residual image at an even lower resolution level. The images at each level may be referred to as the levels of a pyramid. The differences in frequency for the images of each pyramid level illustrate various image features at different resolutions. Once the decomposition function is completed, the images formed at the various levels of the pyramid are modified in a desired manner, such as to perform edge or contrast enhancement and the like. The images at the various levels of the pyramid may also be combined through weighted functions to afford each pyramid level image a different amount of impact upon a resulting image. The final processed image is computed through a reconstruction algorithm. For instance, edge enhancement may be achieved by heavily weighting the first few decomposed images (i.e., pyramid level zero).

Many different algorithms have been proposed for performing multi-resolution imaging. A common characteristic of multi-resolution imaging algorithms is that decomposition is achieved by applying a filter to the pixel values of the image. For instance, a low pass filter may be used in a convolution process to create each pyramid level. During each iteration through the multi-resolution processing technique, the low pass filter operates upon each pixel within the image, including all of the image border pixels. The filter is applied to the image border by overlaying a filter kernel upon each pixel along the image border and modifying the image pixel based upon the surrounding pixel values overlaid by the filter kernel. For instance, an image pixel overlaid by the center element of a filter kernel may be replaced with an average of the sum of the products of the filter kernel elements and overlaid image pixels. When a filter operates upon the border pixels of the image, a portion of the filter kernel extends beyond the edge of the image. The filter kernel elements that extend beyond the image edge still contribute to the filtered value that replaces an image pixel. Hence, an error is introduced into the resulting filtered image pixel since a portion of the filter kernel extends beyond the image edge. Errors formed by the filter kernel when processing an image edge appear as an artifact in the image to be displayed ultimately.

When using multi-resolution algorithms to process images, such as during digital radiography, incorrect treatment of edges and edge regions may create image artifacts which extend far into the interior of the image. The edges may be caused by collimators located about the patient region of interest during the X-ray process. Edges may also be caused by defective pixels along the border of the X-ray detector. Also, the edge of the radiation field also creates artifacts when processed.

During multi-resolution (MR) processing, the images are decomposed into successive lower resolution images (or pyramid levels) via the convolution of the radiation image with a low pass filter of finite size (e.g., a 3×3, 5×5, 7×7 element array, etc.). Each subsequent pyramid level is typically one-half the size of its predecessor level. Hence, it is preferable that the original image size be integer divisible by $2^N$, where N is the number of levels to be computed during decomposition. Each pyramid level contains specific frequency content. After the transformation of each pyramid level, an output image is constructed by reversing the decomposition process.

One problem that occurs during decomposition is, when the filter kernel is centered over pixels at the edge of the radiation image, no image data exists for convolution with the outer elements of the filter kernel extending beyond the image. For instance, when the filter kernel is centered over a corner pixel of a radiation image and the filter kernel is a 3×3 array, five elements of the filter kernel have no underlying image data, upon which to operate. In the past, it has been proposed to "pad" the radiation image with a border of zeros, where the width of the border was dependent upon the size of the filter kernel. Decomposition is a recursive algorithm and thus the padding must be iteratively placed around the radiation image at each pyramid level. For instance, if the MR algorithm uses eight pyramid levels, the image at each of the eight pyramid levels must be padded with zeros. The padding does not accurately reflect the image data values along the image edge and thus creates an artifact during decomposition in each pyramid level image. The artifacts are carried to each lower level pyramid image and magnified at each pyramid level when a new border of zero padding is added until reaching the bottom of the pyramid where the error becomes quite large.

X-ray systems have recently been proposed which utilize digital X-ray detectors that offer much improved resolution. Digital detectors have in turn enabled X-ray systems to greatly enhance illustrations of small image features. Heretofore, conventional digital detectors inherently exhibited enough noise to mask the artifacts or errors caused by MR processing of image borders. The inherent detector noise covered up artifacts created during the image processing of the borders. Modern digital detectors now offer higher signal-to-noise ratios and thus artifacts created during MR processing of an image border have become more noticeable.

X-ray systems utilize image detectors having a generally fixed size. However, it is not always necessary to view a region of a patient as large as the detector. The size of the patient region that is exposed to X-rays is reduced by blocking a portion of the X-ray source from the patient with a collimator. By way of example, an X-ray detector may capture a radiation image formed of a 2K×2K array of pixel values. The radiation image may include a region associated with (e.g. located behind) the collimator. The border between the collimator and the patient's area of interest is defined by an edge since the collimator blocks radiation, while the patient's body passed a majority of the radiation. The edge has a broad frequency signal component.

An operator may collimate the field of interest to expose a smaller region of interest than the full field of view. When a collimator is used, a region exists within the image which is termed a non-clinical region. Non-clinical regions may be removed or "cropped" such that the resulting image no longer has a desired shape or size, such as sides that are integer divisible by $2^N$. The gray scale transition of image data from inside the field of view to outside the field of view contains substantial frequency content. Consequently, multi-resolution algorithms typically perform edge enhancement of high frequencies and dynamic range compression of the lower frequencies. Thus, conventional multi-resolution techniques enhance the "non-clinical" edges and subtract the artificial low frequency information across the entire image. In the past, the artificial low frequency components of the radiation image formed by the collimator may influence interior pixels as far as 10–20 cms into an image.

Further, unattenuated non-clinical regions of the image may influence interior-clinical regions. The potential influence of unattenuated non-clinical regions upon interior regions is due to the fact that the radiation image has a very broad band frequency spectrum. Past systems have not satisfactorily limited the influence of unattenuated regions upon clinical regions.

A need exists for an improved image processing method and apparatus that overcomes the above discussed problems. It is an object of the preferred embodiments of the present invention to meet this need.

SUMMARY OF THE INVENTION

A method and apparatus are provided according to a preferred embodiment of the present invention for processing a radiation image containing clinical and non-clinical regions. The non-clinical regions are identified and removed or cropped to form an intermediate preprocessed image conforming to the boundaries of the clinical region. The intermediate preprocessed image is combined with a border region along at least one side of the clinical region of the radiation image. The size and configuration of the newly added border are controlled in order to achieve a resultant image having a predetermined size and configuration easily processed in a multi-resolution image processing technique to be performed upon the radiation image. Once the border region is formed and combined with the clinical region, a multi-resolution imaging technique is performed to image process the clinical region and the border. By "cropping" the non-clinical region and substituting therefore a border of desired size and shape, the method and apparatus of the preferred embodiment pretreat a radiation image to minimize artifacts and errors associated with multi-resolution processing of non-clinical regions and edges.

According to an alternative embodiment, the border region is assigned pixel values which are determined as a function of the pixel values in the clinical region. Optionally, the pixel values of the border region may mirror adjacent pixel values in the clinical region.

According to yet a further alternative embodiment, a method and apparatus are provided in which the X-ray system utilizes predetermined information and/or detection algorithms to locate the non-clinical regions (e.g., identify the position of a collimator, or defective detector pixels and the like). The non-clinical regions are cropped such that all remaining image pixels correspond to a field of interest from a patient. The perimeter of the image is padded with a border having a width sufficient to result in a preprocessed image having dimensions that are integer divisible by $2^N$. The pixel values for the border are computed based on a low pass mirroring function. During pyramid decomposition, the decomposed image at each pyramid level is iteratively padded with a border of pixels that is assigned values based on a low pass mirroring function. The size of the border is chosen to form resultant images at each pyramid level of a size suitable for use with an MR algorithm. For instance, the border may have a width of the (filter size −1)/2. Once the MR pyramid is built, a transform function is performed and an output image is reconstructed and recropped to form an image having a size corresponding to the original radiation image.

In yet a further alternative embodiment, a method and apparatus are provided for an MR mirroring technique. Once a non-clinical region is identified and removed, the remaining clinical region is combined with a border to enlarge the image to a desired target size. Temporarily, the pixel values associated with the border may be assigned zero values. Next, the MR mirroring technique may scan the newly formed image along at least some horizontal rows of pixels. The MR mirroring technique copies the values of pixels from along the row inside of the clinical region to corresponding pixel values outside the clinical region in the border. The mirroring technique may be repeated on both the left and right sides of the image. Next, the MR mirroring technique scans vertically along at least some columns of the pixels in the newly formed image. The MR mirroring technique copies values of pixels from inside the clinical region of the image to corresponding pixel locations in each column outside of the clinical area. The vertical scanning technique may be performed on both the top and bottom sides of the image. Entire rows and columns need not be scanned. Instead, only a number of pixels within the clinical area need be scanned sufficient to assign pixel values to the border regions. The pixel values in the border regions may be further altered by performing a convolution operation with a low pass filter to remove any discontinuities.

Optionally, the radiation image and border may be formed of an array of pixel values and the multi-resolution imaging technique may use a filter kernel to modify pixel values of the clinical region based on pixel values of the border that correspond to adjacent pixel values of clinical region. The non-clinical region may be located around or inside the clinical region. When the non-clinical region is formed inside the clinical region, the non-clinical region may be overlaid with a border configured as a patch and containing pixel values assigned based on the clinical region pixel values surrounding the non-clinical region. The border may be along one side of the clinical region or more.

A further embodiment of the present invention includes a method and apparatus of preprocessing a portion of a radiation image corresponding to a region of interest representative of a patient. A field of view is collimated to expose a smaller patient region of interest than a full field of view of the radiation image. A radiation image is obtained which contains a region of interest and a collimated image region bordering the region of interest along at least one side. The collimated image region is identified, such as by identifying the position of the collimators through the use of sensors, based on predetermined collimator locations, based on an image recognition technique which processes the radiation image to identify the collimated image region and the like. The collimated image region, once identified, is replaced with corrective pixel value data that is determined based on data values from the region of interest.

BRIEF DESCRIPTION OF THE DRAWINGS

FIG. 1 illustrates a radiation image and border processed in accordance with a preferred embodiment of the present invention.

FIG. 2 illustrates a corner of a radiation image containing a clinical region and border strips along the left and bottom sides of the clinical region formed during preprocessing in accordance with a preferred embodiment of the present invention.

FIG. 3 illustrates a processing sequence carried out in accordance with a preferred embodiment of the present invention to process radiation images.

FIG. 5 illustrates a radiation image processed in accordance with a preferred embodiment of the present invention containing a clinical region surrounded by non-clinical regions representative of collimator blades.

FIG. 6 illustrates a radiation image processed in accordance with a preferred embodiment of the present invention containing a clinical region surrounded by non-clinical regions formed by collimator blades cooperating to produce a region of interest for the patient oriented at an angle to the radiation image.

FIG. 7 illustrates a radiation image processed in accordance with a preferred embodiment of the present invention containing a clinical region surrounded by curved non-clinical regions.

FIG. 8 illustrates a radiation image processed in accordance with a preferred embodiment of the present invention containing a clinical region of indeterminate shape adjacent a non-clinical region formed by a foreign object within the patient.

FIG. 9 illustrates a radiation image processed in accordance with a preferred embodiment of the present invention, including a clinical region surrounded by an area of high radiation which is surrounded by an area of no radiation.

FIG. 10 illustrates a radiation image processed in accordance with a preferred embodiment of the present invention containing clinical and non-clinical regions of indeterminate size and shape.

DETAILED DESCRIPTION OF THE PREFERRED EMBODIMENT

Figure 4:
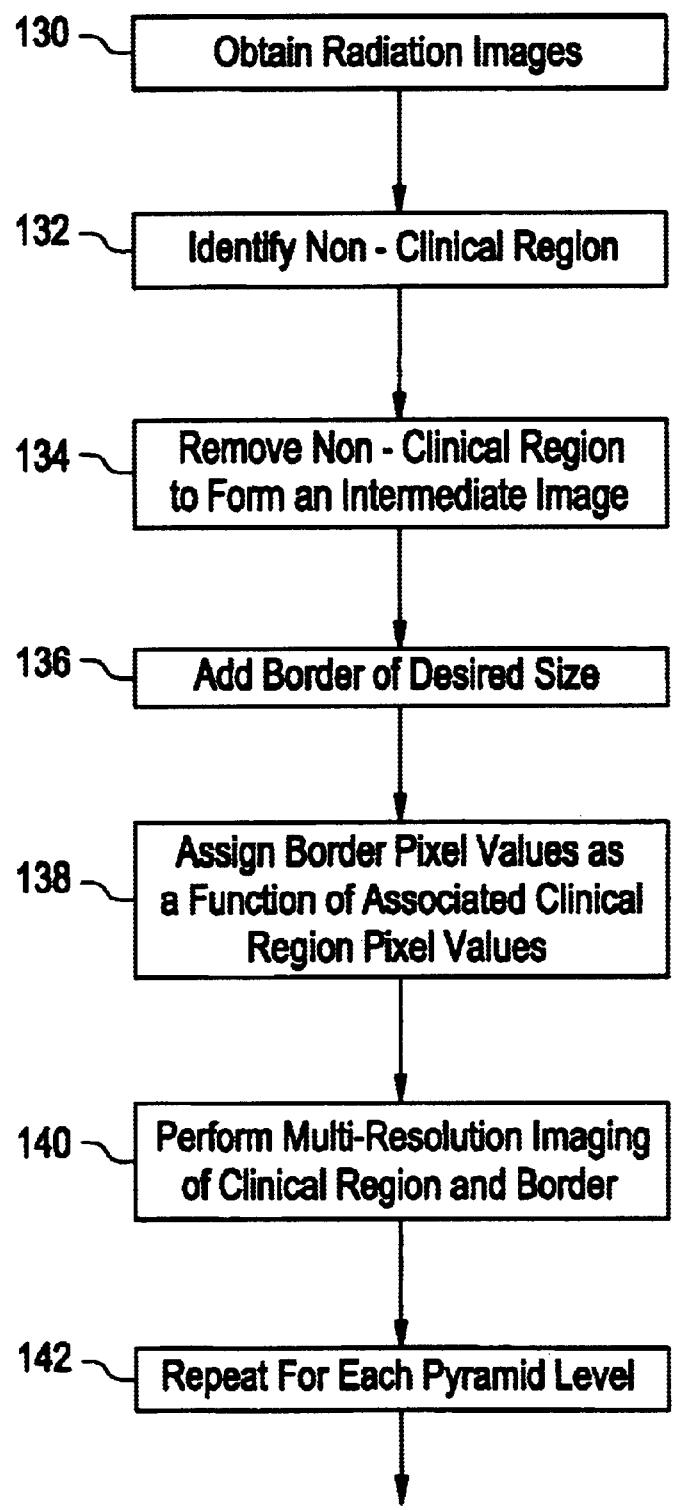
FIG. 4 illustrates a processing sequence carried out in accordance with a preferred embodiment of the present invention.

The preferred embodiment of the present invention is carried out in connection with a digital radiography system in which a radiation image of a patient is recorded on a digital detector or screen/film or storage phosphor by exposing the detector screen/film or storage phosphor to X-rays emitted from an X-ray source and transmitted through a portion of a patient to be examined. The detector, screen/film or storage phosphor is fed to a radiation image readout apparatus in which the image stored on the detector, screen/film or storage phosphor is scanned and stored electronically in a computer. Optionally, the detector, screen/film or storage phosphor may represent a digital detector such as a CCD detector. The radiation image is stored in the image processor memory as a digital raw image signal. The image processor performs a multi-resolution processing technique upon the digital raw image signal by decomposing the raw image into multiple pyramid images of different resolution levels and into a residual image. The pyramid images and the residual image may then be stored for subsequent manipulation for image display and analysis. A reconstructed image is obtained by applying an inverse of the decomposition procedure to the pyramid images and the residual image.

Turning to FIG. 1, a radiation image 10 is illustrated such as stored in the image processor memory as a digital row image signal. The radiation image 10 comprises an array of digital pixels representative of the clinical and non-clinical regions obtained during digital radiography. The radiation image 10 is defined by left and right edges 14 and 16, and top and bottom edges 18 and 20, respectively. The radiation image 10 is surrounded by a border 22 generally designated in dashed lines. In the example of FIG. 1, the border 22 comprises a plurality of border pixel values 24 configured to define left, right, top and bottom border regions 26, 28, 30 and 32, respectively.

Optionally, the border 22 may be placed only along one side of the radiation image 10. In FIG. 1, the border 22 is illustrated as a rectangular frame of one pixel in width. Alternatively, the border 22 may be configured in any arbitrary shape, such as square, round, triangular, trapezoidal, etc. Alternatively, the border 22 may be configured under operator-control on the fly. Also, the border 22 may have a width greater than one pixel value or may have different regions of different pixel thicknesses (e.g., left and right border regions 26 and 28 of different widths, etc.).

FIG. 1 also illustrates a filter kernel 34 that may be used during multi-resolution (MR) image processing to operate upon the digital image pixels 12 of the radiation image 10 while performing MR decomposition of the various pyramid levels. The filter kernel 34 comprises an array of filter elements 36 separately denoted by reference letters a–i. In the example of FIG. 1, the filter kernel 34 is comprised of a 3×3 array of filter elements 36. Dashed lines 38–41 illustrate one example of how the filter kernel 34 is overlaid upon a portion of the radiation image 10 in order to operate upon a digital image pixel 12. For example, the filter kernel 34 may operate upon digital image pixel 12 denoted by reference letter v by centering the filter kernel 34 around pixel v. During MR processing, the digital image pixel v may be modified based on the convolution of image pixels r–z and filter elements a–i, namely, r*a; s*b; t*c; u*d; v*e; w*f; x*g; y*h and z*i. The convolution result is used to replace pixel v in a modified image, such as at a pyramid level during the MR image processing.

FIG. 2 illustrates a portion of a radiation image 10 processed in accordance with an alternative embodiment of the present invention. The radiation image 10 includes a clinical region, a portion of which is denoted by the bracket 70. The clinical region 70 includes an outer edge 72 and a bottom edge 74. The clinical region 70 comprises a plurality of digital image pixels 76 formed in an array. The clinical region 70 is processed according to an alternative embodiment of the present invention whereby at least one edge 72 or 74 of the clinical region 70 is bordered with a vertical or horizontal padding strip 78 or 80, respectively. The width of the padding strip 78, 80 may depend on the size of the filter kernel 82. In FIG. 2, the filter kernel 82 is defined by a 5×5 array of filter elements 84. For instance, the vertical and horizontal padding strips 78 and 80 may be two pixels wide when a 5×5 filter kernel 82 is utilized during MR image processing. Alternatively, the filter strips 78 and 80 may be one pixel wide when used with a 3×3 filter kernel, three pixels wide when used with a 7×7 filter kernel, and the like. Lines 85–88 illustrate the alignment of the filter kernel 82 when centered over a corner pixel $I_7$ of the clinical region 70. Pixel $I_7$ is modified based on a filtering function carried out by the convolution of the filter elements 84 ($f_1$–$f_{25}$) and the padding and image pixels $P_1$–$P_{16}$ and $I_1$–$I_9$.

According to an alternative embodiment of the present invention, the padding pixel values 90 and the vertical and horizontal padding strips 78 and 80 are determined based on digital image pixel values 76 for pixels located proximate associated padding pixels 90. For instance, padding pixel value $P_2$ may be determined as a function of image pixel value $I_1$. Similarly, padding pixel value $P_1$ may be assigned based on a function of image pixel value $I_2$. Padding pixel value $P_9$, $P_{10}$, $P_{11}$, $P_{14}$, $P_{15}$ and $P_{16}$, may be determined as functions of image pixel values $I_7$, $I_8$, $I_9$, $I_4$, $I_5$, and $I_6$, respectively. Padding pixel values $P_7$, $P_8$, $P_{12}$ and $P_{13}$ may be determined as a function of image pixel values $I_4$, $I_5$, $I_7$ and $I_8$, respectively. For instance, padding pixel values $P_1$ and $P_2$ may equal image pixel values $I_1$ and $I_2$, respectively. Alternatively, padding pixel values $P_1$ and $P_2$ may be assigned values based on an average or some linear or non-linear function of image pixel values $I_1$ and $I_2$. Further, a padding pixel 90 may be assigned a value based on multiple image pixels and/or based on surrounding padding pixels. For instance, padding pixel $P_4$ may be assigned based on an average or correlation between image pixels $I_4$ and $I_5$, or $I_1$, $I_4$ and $I_7$, or $I_1$–$I_9$, and the like.

The padding pixel values $P_1$–$P_{16}$ may be obtained from a look-up table, whereby the image values $I_1$–$I_9$ are used to address the look-up table to obtain associated padding pixel values. Alternatively, the padding pixel values $P_1$–$P_{16}$ may simply be assigned based on a mirroring function, whereby image pixels $I_1$–$I_9$ are "mirrored" into the adjacent padding pixels 90 (e.g., padding pixel $P_2$=image pixel $I_1$, padding pixel $P_1$ equals image pixel $I_2$).

Next, the discussion turns to FIG. 3 which illustrates an exemplary processing sequence carried out according to a preferred embodiment of the present invention. Initially at step 100, a radiation image is obtained and an edge of the radiation image is identified (step 102). The edge of the image may be identified based on 1) predetermined detector edge coordinates, 2) sensors that measure and transform the detector edge location into coordinate values, 3) through the use of image processing software capable of identifying an image edge, and the like. Once the radiation edge is identified, at least one padding strip or border is added along at least a portion of one side of the clinical region (step 104). While the edges 72 and 74 illustrated in FIG. 2 represent straight lines, the radiation image edge need not be straight, but may be of any desired shape and configuration. The amount, shape and width of the padding or border placed around the clinical region in step 104 may be based on the filter kernel size to be used during multi-resolution processing. For instance, if a 5×5 filter kernel is desired for use during MR processing, it may be preferable to add a border or padding strip of two pixels in width. Once the border or padding has been added in step 104, values are assigned to the padding or border pixels. The padding/border pixels may be determined based on the values of image pixels in the immediate proximity of the border or padding pixel to be assigned a value. As noted above, the values of the padding pixels may equal values of pixels in the clinical region or may be assigned based on a combination of values from image pixels in the clinical regions and the like.

Once the padding pixel values are assigned, the image processing system performs a multi-resolution imaging technique upon the radiation image and the padding strip or border to form an image at a pyramid level of the MR imaging process. Throughout the MR imaging process to form the image for a given pyramid level, the filter kernel is continuously shifted from pixel to pixel within the clinical region. For instance, referring to FIG. 2, the filter kernel 82 may be first centered at image pixel $I_7$, and next moved to be centered at image pixel $I_8$ and then $I_9$, etc. Once the filter kernel 82 operates upon every pixel within the clinical region 70, processing moves to step 110 in FIG. 3. At step 110, the above discussed steps 104–108 are repeated a desired number of times for each pyramid level. Hence, if the MR technique utilizes eight pyramid levels, steps 104–108 will be repeated eight times.

FIG. 4 illustrates the processing sequence carried out according to an alternative embodiment of the present invention in which non-clinical regions are corrected prior to MR processing. In FIG. 4, initially a radiation image is obtained at step 130 and a non-clinical region within the radiation image is identified at step 132. The non-clinical region may be attributed to a variety of sources, such as a collimator blade, defective pixels in the detector, a foreign object within or on a patient, raw radiation (such as experienced when scanning a chest in the lateral position) and the like. The non-clinical region may be identified in a variety of manners. For instance, the position of collimator blades may be predetermined or identified by sensors which convert the collimator position to a coordinate position within the radiation image. Alternatively, non-clinical regions may be identified through preprocessing software routines which are configured to identify particular edge configurations or large differences in gray scales associated with large section of adjacent image pixels. As yet a further alternative, a user interface may be provided by which a doctor or operator enters the shape and configuration of the clinical and/or non-clinical regions. For instance, a pre-processed radiation image may be displayed to a doctor or operator who is permitted to use a light pen to draw around the perimeter of the clinical region or the perimeter of a subclinical region of interest.

Optionally, more than one non-clinical region may be identified and corrected for within a radiation image. Multiple non-clinical regions may be entirely separate, discrete and independent of one another.

Once the non-clinical regions are identified in step 132, the non-clinical regions are removed in step 134 to provide an intermediate radiation image containing only an area of interest such as a clinical region. The intermediate image is smaller than the initial radiation image and thus may be smaller than preferable for MR image processing. A border is added at step 136 to the intermediate image. The size of the border may be varied such that the resulting rebuilt image is of a size preferable for manipulation during MR image processing. For instance, it may be preferable for the MR image processing technique to operate upon an image that is integer divisible by $2^N$, where N is the number of pyramid levels constructed. Consequently, in step 136, a border region is added to rebuild the intermediate image to a size that is integer divisible by $2^N$. At step 138, values are assigned to the border pixels. As discussed above, the values associated with the border pixels may be assigned as a function of clinical region pixel values. For instance, a mirroring operation may be performed hereby border pixels are assigned values equal to associated clinical region pixel values located proximate thereto, such as in a mirroring function. Alternatively, the border pixel values may be assigned based on values in a look-up table which are accessed by the clinical region pixel values. Each border pixel value may further be assigned based on a combination of multiple clinical region pixel values or based on clinical region pixel values and prior assigned border pixel values.

Once the border pixel values are assigned at step 138, a multi-resolution imaging technique is performed at step 140 upon the clinical region and the newly formed border. The MR imaging technique produces an image at a pyramid level. Steps 132–140 are repeated for each pyramid level. Alternatively, only steps 134–140 need be repeated when the shape of the clinical region remains unchanged between pyramid levels.

FIGS. 5–10 illustrate alternative radiation images which may be processed according to the preferred embodiments of the present invention. FIG. 5 illustrates a radiation image 200 containing a square clinical region 210 surrounded by non-clinical regions 202, 204, 206 and 208 representative of collimator blades located about an area of interest of a patient.

FIG. 6 illustrates a radiation image 220 containing a clinical region 230 surrounded by non-clinical regions 222, 224, 226 and 228 representative of collimator blades. The collimator blades 222–228 have been configured to orient the clinical region 230 at an angle with respect to the radiation image 220. FIG. 7 illustrates a radiation image 240 including a clinical region 250 of indeterminate shape surrounded by non-clinical regions 242–248 of different shapes and configurations representative of collimator blades, bad pixels within the detector, or raw radiation due to patient alignment.

FIG. 8 illustrates a radiation image 260 including a non-clinical region 262 surrounded by a clinical region 264 surrounded by yet another non-clinical region 266. Non-clinical region 266 is further surrounded by additional non-clinical regions 268, 270 and 272 representative of collimator blades. The clinical region 264 may represent an area of particular interest to a doctor as being affected by the presence of a foreign object, such as a pacemaker defibrillator. The clinical region 264 may not extend to the full area bordered by the collimator blades 268–272.

A physician may designate an edge 274 surrounding a clinical region 264, such as while viewing a raw radiation image by drawing with a light pin a line around the region clinical 264 of interest.

FIG. 9 illustrates a radiation image including a clinical region 282 surrounded by a raw radiation area 284 surrounded by a non-clinical region 286 representative of collimator blades. The radiation image 280 may correspond to an examination of the chest while in the lateral position. The raw radiation area 284 has a high radiation content and thus forms a sharp contrast at edge 288 with the clinical region 282. The non-clinical region 286 is formed by the collimator blades as a low radiation content and thus forms a sharp edge 290 between the gray scale values of the pixels in the raw radiation area 284 and the non-clinical region 286. According to an alternative embodiment, the processing sequences of FIGS. 3 and 4 may be carried out to remove not only the non-clinical region 286, but also the high raw radiation area 284, leaving only the clinical region 282 for processing. A border may be built around one or more sides of the clinical region 282 to reconstruct an image of a size that is preferable for processing during the MR imaging techniques. The values assigned to the border pixels, once the intermediate image is reconstructed to a larger desirable size, may be assigned based on the pixel values of the clinical region 282.

FIG. 10 illustrates yet a further alternative raw radiation image 300 containing a clinical region 302 and a non-clinical region 304. According to an alternative embodiment of the present invention, the non-clinical region 304 may be identified and removed and replaced with data values based on the pixel values in the clinical region 302 and in the surrounding radiation image region 306.

Optionally, when the non-clinical regions are interior to the radiation image, the non-clinical region pixel values may be replaced with previously chosen pixel values, such as from a prior image, a template, an original image and the like.

Figures 11, 12:
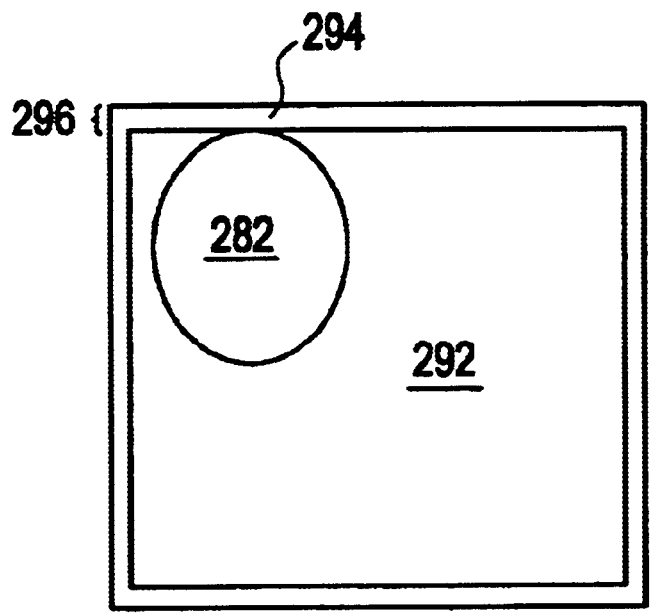
FIG. 11 illustrates an intermediate image with a border and edge strip added according to a preferred embodiment of the present invention.
FIG. 12 illustrates an example of a padding implementation of a portion of a radiation image according to a preferred embodiment of the present invention.

FIG. 11 illustrates a resulting image created according to an alternative embodiment of the present invention in carrying out the processing steps of FIGS. 3 and 4 while processing the radiation image of FIG. 9 corresponding to a scan of the chest while in the lateral position. The resulting image of FIG. 11 includes the clinical region 282 of FIG. 9, but located in the upper left corner of a resultant image 292 having a size that is preferable for operation during the MR processing technique. The resultant image 292 is surrounded by a padding strip 294. The width 296 of the padding strip 296 is determined based on the size of the filter kernel for use during MR processing.

FIG. 12 illustrates an example of a padding implementation for a portion of the radiation image. The radiation image includes three rows and seven columns, while the padding strip includes two rows and two columns. The values assigned to padding pixels are set to equal immediately adjacent image pixels such as through a mirroring technique.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for processing medical diagnostic images containing a clinical region and a non-clinical region, comprising:

obtaining a medical diagnostic image containing a clinical region and a non-clinical region, said clinical region comprising diagnostic image data including pixel values representative of patient data, said non-clinical region comprising non-diagnostic image data including pixel values representative of non-patient data;

identifying an edge of said image proximate the clinical region;

adding a border of pixels along a portion of the clinical region based on the size of a filter kernel;

assigning values to the border pixels associated with the clinical region;

performing multi-resolution image filtering technique upon said image at a given pyramid level of said image filtering technique by overlaying said filter kernel over said image and continuously shifting said filter kernel from pixel to pixel within the clinical region; and repeating said adding, assigning, and filtering steps as necessary for each of said given pyramid levels of said image filtering technique.

2. The method of claim 1, wherein the medical image and border are formed of an array of pixel values and said assigning step includes:

assigning border pixel values based on a mirroring function of values of clinical region pixels located proximate the associated border pixels.

3. The method of claim 2, wherein the assigning step sets the border pixel values equal to adjacent pixel values in the clinical region.

4. The method of claim 1, further comprising:

identifying the non-clinical region; and replacing the non-clinical region with the border.

5. The method of claim 1, further comprising:

locating the border along one side of the clinical region.

6. The method of claim 1, further comprising:

identifying a non-clinical region inside the clinical region;

forming a mirroring patch as the border based on pixel values in the clinical region; and overlaying the non-clinical region with the patch.

7. The method of claim 1, wherein the non-clinical region surrounds the clinical region, the adding step overlaying at least a portion of the non-clinical region adjacent the clinical region with one of said border that surrounds the clinical region and a strip along at least one side of the clinical region.

8. The method of claim 1, wherein the medical image and border are a digital pixel array, the method including a multi-resolution imaging technique using a 5×5 filter kernel that iteratively replaces the pixels of the clinical region with filtered pixel values derived from one of filter elements, old clinical pixel values and border pixel values that mirror associated clinical pixel values.

9. The method of claim 1, wherein the medical image and border form a pixel array, the method further comprising:

forming a border at least two pixel rows wide; and mirroring values of at least two rows of pixels in the clinical region onto at least two rows of pixels in the non-clinical region during multi-resolution imaging of a radiation image.

10. The method of claim 1, further comprising:

repeating the edge identifying step during each decomposition level of the multi-resolution imaging technique.

11. A method of pre-processing a portion of a digital radiation image containing pixel values representative of an X-ray scan of a region of interest of a patient, comprising:

collimating a field of view of an X-ray system to expose a patient region of interest smaller than a full size of a radiation image;

obtaining a radiation image containing a region of interest representative of a patient X-ray scan and containing a collimated image region bordering at least one side of the region of interest;

identifying the collimated image region;

removing the collimated image region such that an intermediate radiation image containing the region of interest remains;

adding a border of pixels along a portion of the region of interest based on the size of a filter kernel;

assigning values to the border pixels based on pixel values in the region of interest;

performing a multi-resolution image filtering technique upon said intermediate radiation image and border at a given pyramid level of said image filtering technique by overlaying said filter kernel over said intermediate radiation image and border and continuously shifting said filter kernel from pixel to pixel within said region of interest and border; and repeating said identifying, removing, adding, assigning, and image filtering steps for each of said given pyramid levels of said image filtering technique.

12. The method of claim 11, wherein said identifying step includes:

calculating pixel coordinates of at least one reference point for the collimated image region based on a collimator sensor.

13. The method of claim 11, wherein said identifying step includes:

calculating a location of the collimated image region based on predefined collimator position settings.

14. The method of claim 11, wherein said identifying step includes:

performing edge detection upon the radiation image to locate the collimated image region.

15. The method of claim 11, wherein said border cooperates with the region of interest to construct a multi-resolution preprocessed image.

16. The method of claim 11, wherein the adding step includes:

forming a border and region of interest having dimensions that are integer divisible by two.

17. The method of claim 11, further comprising:

forming a border strip along at least a portion of one side of the intermediate radiation image, the border strip having border pixel values based on pixel values of the intermediate radiation image.

18. A system for pre-processing a portion of a digital radiation image containing pixel values representative of an X-ray scan of a region of interest of a patient, comprising:

a digital detector having a pixel array for obtaining a radiation image having clinical and non-clinical regions, the clinical regions including pixel values representative of patient data, the non-clinical regions including pixel values representative of non-patient data;

means for identifying a non-clinical region in the radiation image;

an MR pre-processing subsystem that removes an identified non-clinical region to form an intermediate image and that adds a border of pixels to the intermediate image, said MR subsystem assigning border pixel values as a function of values for associated clinical region pixels; and a multi-resolution imaging subsystem including a filter kernel for performing a multi-resolution processing of a clinical region and said border, said border being based on the size of said filter kernel, said filter kernel being overlaid over said radiation image and continuously shifted from pixel to pixel within said clinical region and border to form an image for a given pyramid level of said multi-resolution process.

19. The system of claim 18, further comprising:

a sensor for detecting at least one reference point for said non-clinical region.

20. The system of claim 18 further comprising:

an edge detector for locating, in the radiation image, an edge between said clinical and non-clinical regions.

21. The system of claim 18, further comprising:

a mirroring processor assigning border pixel values to mirror values of proximate clinical pixels.

22. The system of claim 18, wherein said MR preprocessing subsystem forms a preprocessed image containing said border and clinical region that is integer divisible by two.

23. The system of claim 18, wherein said MR preprocessing subsystem forms a border strip along at least a portion of one side of the radiation image, the border strip having border pixel values based on pixel values of the radiation image.

24. A medical diagnostic system for processing medical images, comprising:

a digital detector for obtaining a medical image having clinical and non-clinical regions, the non-clinical regions including pixel values representative of at least one of a collimator, a foreign object, no radiation and defective pixels, the clinical regions including pixel values representative of patient data;

a detector for identifying at least one edge of the clinical region;

an image enhancer for adding a strip of predetermined width of digital padding to at least one edge of the clinical region and assigning values to pixels of the padding based on values of pixels in the clinical region to form a preprocessed medical image; and a filter kernel for filtering at least a portion of the preprocessed medical image at a given pyramid level by being overlaid over said preprocessed medical image and being continuously shifted from pixel to pixel within a portion of the clinical region and the padding, wherein said padding is based on the size of said filter kernel, said image enhancer and filter kernel being used again for each paid level of filtering.

25. The system of claim 24, wherein the image enhancer adds said strip as said padding around the medical image.

26. The system of claim 24, wherein the image enhancer adds a border as said padding inside the preprocessed medical image to replace at least part of said non-clinical region.

27. The system of claim 24, wherein said image enhancer mirrors padding pixel values and associated pixel values of the clinical region.

28. The system of claim 24, wherein said detector includes a sensor to detect a position of a collimator blade; and said image enhancer removes non-clinical regions corresponding to said collimator blade.

29. The system of claim 24, wherein said detector identifies said non-clinical region.

30. The method of claim 1, wherein said adding step includes assigning border pixel values based on previously chosen pixel values from one of a prior medical image, a template, and an original medical image.

31. The method of claim 11, wherein said adding step includes assigning corrective pixel values previously chosen pixel values from one of a prior radiation image, a template, and said radiation image obtained in said obtaining step.

32. The system of claim 18, wherein said MR preprocessing subsystem assigns border pixel values based on previously chosen pixel values from one of a prior radiation image, a template and said radiation image obtained by the digital detector.

33. The system of claim 24, wherein said image enhancer replaces pixel values based on previously chosen pixel values from one of a prior medical image, a template and said medical image obtained by said digital detector.

* * * * *